United States Patent
Heredia et al.

(10) Patent No.: US 10,029,792 B2
(45) Date of Patent: Jul. 24, 2018

(54) PERSONAL ELECTRONIC DEVICE MOUNTING ASSEMBLIES

(71) Applicant: Zodiac Seats US LLC, Gainesville, TX (US)

(72) Inventors: Homero Heredia, Chihuahua (MX); Raul Reyes, El Paso, TX (US); Armando Valdes, Krum, TX (US); Garrett Wolfe, Lewisville, TX (US)

(73) Assignee: Zodiac Seats US LLC, Gainesville, TX (US)

( * ) Notice: Subject to any disclaimer, the term of this patent is extended or adjusted under 35 U.S.C. 154(b) by 237 days.

(21) Appl. No.: 14/442,316

(22) PCT Filed: Nov. 12, 2013

(86) PCT No.: PCT/US2013/069611
§ 371 (c)(1),
(2) Date: May 12, 2015

(87) PCT Pub. No.: WO2014/075044
PCT Pub. Date: May 15, 2014

(65) Prior Publication Data
US 2016/0280375 A1    Sep. 29, 2016

Related U.S. Application Data

(60) Provisional application No. 61/725,171, filed on Nov. 12, 2012, provisional application No. 61/725,175, filed on Nov. 12, 2012.

(51) Int. Cl.
*B64D 11/00* (2006.01)
*B64D 11/06* (2006.01)
(Continued)

(52) U.S. Cl.
CPC ........ *B64D 11/00152* (2014.12); *B60N 3/004* (2013.01); *B60R 11/02* (2013.01);
(Continued)

(58) Field of Classification Search
CPC .... B60R 7/043; B60R 2011/0012–2011/0017; B60R 2011/0276; B60N 3/004
(Continued)

(56) References Cited

U.S. PATENT DOCUMENTS 2,226,854 A * 12/1940 Gohn ...................... E05B 17/10
                                                    362/100
5,984,347 A * 11/1999 Blanc-Rosset ......... B60N 3/004
                                                    224/275
(Continued)

FOREIGN PATENT DOCUMENTS

FR    2898315    9/2007
WO    2002054169   7/2002
(Continued)

OTHER PUBLICATIONS

International Patent Application No. PCT/US2013/069611, International Search Report and Written Opinion dated Feb. 24, 2014.
(Continued)

*Primary Examiner* — Brian D Nash
(74) *Attorney, Agent, or Firm* — Kilpatrick Townsend & Stockton LLP; Dean W. Russell; Tiffany L. Williams

(57) ABSTRACT

Described herein are personal electronics device mounting assemblies including a passenger seat and a case assembly comprising a case configured to receive a personal electronic device and a male structure pivotally coupled to the case. The personal electronic device mounting assemblies may also include a mounting assembly comprising a female slot structure and a support bracket structure, the female slot structure may be configured to releasably receive the male
(Continued)

structure and the support bracket structure may be configured to attach to the passenger seat. The mounting assembly may be configured to provide support to the case when the male structure is in an extended position and the female slot structure has received the male structure.

13 Claims, 8 Drawing Sheets

(51) Int. Cl.
    *G06F 1/16*         (2006.01)
    *B60N 3/00*        (2006.01)
    *B60R 11/02*       (2006.01)
    *G06F 3/02*         (2006.01)
    *G06F 3/044*       (2006.01)
    *G06F 3/0488*     (2013.01)

(52) U.S. Cl.
    CPC .......... *B64D 11/0015* (2013.01); *B64D 11/06* (2013.01); *B64D 11/0638* (2014.12); *G06F 1/1662* (2013.01); *G06F 1/1673* (2013.01); *G06F 3/0219* (2013.01); *G06F 3/044* (2013.01); *G06F 3/04886* (2013.01); *B60R 11/0211* (2013.01); *B60R 11/0229* (2013.01); *B60R 11/0241* (2013.01); *B60R 11/0252* (2013.01); *B60R 2011/0294* (2013.01)

(58) Field of Classification Search
    USPC ........................................................ 224/275
    See application file for complete search history.

(56) References Cited

U.S. PATENT DOCUMENTS

| | | | | |
|---|---|---|---|---|
| 6,216,927 B1* | 4/2001 | Meritt | ..................... | B60R 11/02 224/275 |
| 7,665,642 B2* | 2/2010 | Abbate | ..................... | A45C 9/00 224/153 |
| 8,561,863 B2* | 10/2013 | LaColla | .................. | B60R 11/02 224/275 |
| 8,783,766 B2* | 7/2014 | Westerink | .......... | B64D 11/0015 297/217.3 |
| 9,004,590 B2* | 4/2015 | Westerink | .......... | B64D 11/0015 297/217.3 |
| 9,421,919 B2* | 8/2016 | Westerink | .......... | B64D 11/0015 |
| 2001/0011664 A1* | 8/2001 | Meritt | ..................... | B60R 11/02 224/275 |
| 2006/0022003 A1* | 2/2006 | Zheng | ................. | B60R 11/0235 224/275 |
| 2006/0075934 A1 | 4/2006 | Ram | | |
| 2007/0222248 A1* | 9/2007 | Maulden | ............... | B60N 2/4876 296/37.15 |
| 2008/0128460 A1* | 6/2008 | Adler | ................... | B60N 2/4876 224/275 |
| 2011/0278885 A1 | 11/2011 | Procter et al. | | |
| 2012/0024920 A1* | 2/2012 | Grolle | ..................... | B60R 11/02 224/275 |
| 2012/0125959 A1* | 5/2012 | Kucera | ............... | B60R 11/0235 224/275 |
| 2012/0139303 A1* | 6/2012 | Westerink | .......... | B64D 11/0015 297/163 |
| 2013/0193174 A1* | 8/2013 | Ackeret | ............... | F16M 11/105 224/275 |

FOREIGN PATENT DOCUMENTS

| | | |
|---|---|---|
| WO | 2008125847 | 10/2008 |
| WO | 2011085023 | 7/2011 |
| WO | 2014075040 A1 | 5/2014 |

OTHER PUBLICATIONS

International Patent Application No. PCT/US2013/069583, International Search Report and Written Opinion dated Feb. 19, 2014.
International Patent Application No. PCT/US2013/069583, International Preliminary Report on Patentability May 21, 2015.
International Patent Application No. PCT/US2013/069611, International Preliminary Report on Patentability dated May 21, 2015.

* cited by examiner

PERSONAL ELECTRONIC DEVICE MOUNTING ASSEMBLIES

CROSS REFERENCE TO RELATED APPLICATIONS

This application is the U.S. national phase entry of International Application Serial No. PCT/US2013/069611 ("the '611 application"), filed on Nov. 12, 2013, which application is related to and claims priority benefits from U.S. Provisional Application Ser. No. 61/725,171 filed on Nov. 12, 2012, entitled "TABLET PC AND KEYBOARD INTEGRATION CONCEPT" ("the '171 application") and U.S. Provisional Application Ser. No. 61/725,175 filed on. Nov. 12, 2012, entitled "KEYBOARD INTEGRATION TRAY" ("the '175 application"), the entire contents of which (i.e., the '611 application, '171 application and the '175 application) are incorporated herein by reference This application is related to International Application Serial No. PCT/US2013/069583, filed on the same day herewith, entitled "INTEGRATED KEYBOARD TRAY," the entire contents of which is hereby incorporated by reference as if fully set forth herein.

FIELD OF THE INVENTION

The disclosure relates to cases for personal electronic devices for use with passenger seats and the systems for mounting such devices.

BACKGROUND

In many instances, passenger vehicles, such as aircraft, buses, trains, ships, and automobiles, include passenger seats with a wide assortment of personal electronic and entertainment options to encourage passengers to remain seated as much as possible during transport for safety, crew mobility, and to enable efficient cabin service. Some passenger seats may provide video and audio entertainment, including television, video games, internet access, and other on-board entertainment ("OBE") or in-flight entertainment ("IFE") components. Typically, these entertainment devices are mounted in the seat backs and/or arm rests of the passenger seats.

With the advent of personal electronic devices ("PEDs"), such as tablet computers, cell phones, smart phones, handheld video game systems, personal digital assistants, palmtop computers, DVD players, data or audio-video media players, monitors, e-reader devices, multi-media enabled devices, and other similar electronic devices, many passengers may prefer to use their own PEDs, rather than the OBE or IFE components that are mounted in the passenger seats.

In some cases, it may be desirable to provide a way for passengers to mount their own PEDs for hands-free viewing and use and/or to connect their PEDs to the OBE or IFE systems or other networks, so that they may use their own PEDs in lieu of the OBE or IFE components. In other cases, the user may not have his or her own PED, but may be more familiar with PEDs of a particular type than he or she is with the OBE or IFE components. Thus, it may be desirable to provide the passenger with a PED similar to his or her own. It may also be desirable to provide the functionality described below without substantially altering the appearance and cosmetic design of the associated passenger seats.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

Embodiments of the disclosure provide personal electronic device assemblies for use with passenger seats. While the personal electronic device assemblies are discussed for use with aircraft seats, they are by no means so limited. Rather, embodiments of the personal electronic device assemblies may be used in passenger seats or other seats of any type or otherwise as desired.

Embodiments of the disclosure may include a personal electronic device support assembly comprising a case comprising an inner surface, wherein the case may be configured to receive a personal electronic device and hold the personal electronic device substantially against the inner surface; a tab may be pivotally coupled to the case, wherein the tab may be configured to hold the case securely in place adjacent a passenger seat when the tab is in an extended position; and an interface coupled to the tab, wherein the interface is configured to connect the personal electronic device to a secondary system when the tab is in the extended position, the secondary system including at least one of data transmission capability and power transmission capability.

According to certain embodiments, the personal electronic device assembly may further include a connection port that may provide a connection between the personal electronic device and the interface when the case receives the personal electronic device.

According to certain embodiments, the tab of the personal electronic device may be pivotally coupled to the case via a friction hinge disposed between the tab and the case, the friction hinge may be configured to maintain a constant friction force through a rotation path of the tab. The rotation path of the tab, in some embodiments, may be between zero and about one-hundred and eighty degrees relative to an outer surface of the case.

According to certain embodiments, the interface of the personal electronic device assembly may include a flexible cable and an electric contact point, at least a portion of the flexible cable may be attached to the tab and pivotally rotatable with the tab, wherein the electric contact point may be configured to connect the personal electronic device to the secondary system.

According to certain embodiments, the secondary system may include at least one of a power supply, a network, an on-board entertainment system, and an in-flight entertainment system; and the personal electronic device may include a tablet computer, a cell phone, a smart phone, a handheld video game system, a personal digital assistant, a palmtop computer, a DVD player, a data or audio-video media player, a monitor, an e-reader device, or a multi-media enabled device.

According to other embodiments, a personal electronic device support assembly may include a female slot structure, wherein the female slot structure may be configured to releasably receive a male structure of corresponding size, and the male structure may be associated with a personal electronic device. The personal electronic device support assembly also comprising a support bracket structure, wherein the support bracket structure may be attached to the female slot structure and configured to support the female slot structure support when the female slot structure receives the male structure; and a connector disposed adjacent the female slot structure.

According to certain embodiments, the personal electronic device mounting assembly may further include a shroud including an access slot sized larger than the male structure of the personal electronic device, wherein a portion of the male structure may extend through the shroud when the female slot structure receives the male structure; and a seat support bracket, wherein the female slot structure, the support bracket structure, and the connector may be disposed between the seat support bracket and the shroud, the seat support bracket may be configured to attach the support bracket structure to a seat.

According to other embodiments, a passenger seat assembly may include a passenger seat and a personal electronic device support assembly, which may further include a case assembly comprising a case configured to receive a personal electronic device and a male structure pivotally coupled to the case. The personal electronic device support assembly may further include a mounting assembly comprising a female slot structure and a support bracket structure, the female slot structure may be configured to releasably receive the male structure and the support bracket structure may be configured to attach to the passenger seat, wherein the mounting assembly may be configured to provide support to the case when the male structure is in an extended position and the female slot structure has received the male structure.

According to certain embodiments, the personal electronic device support assembly of the passenger seat assembly may include an integrated keyboard tray disposed below the case assembly and the mounting assembly. The integrated keyboard tray may be configured to allow a user to interact with at least the personal electronic device.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1:
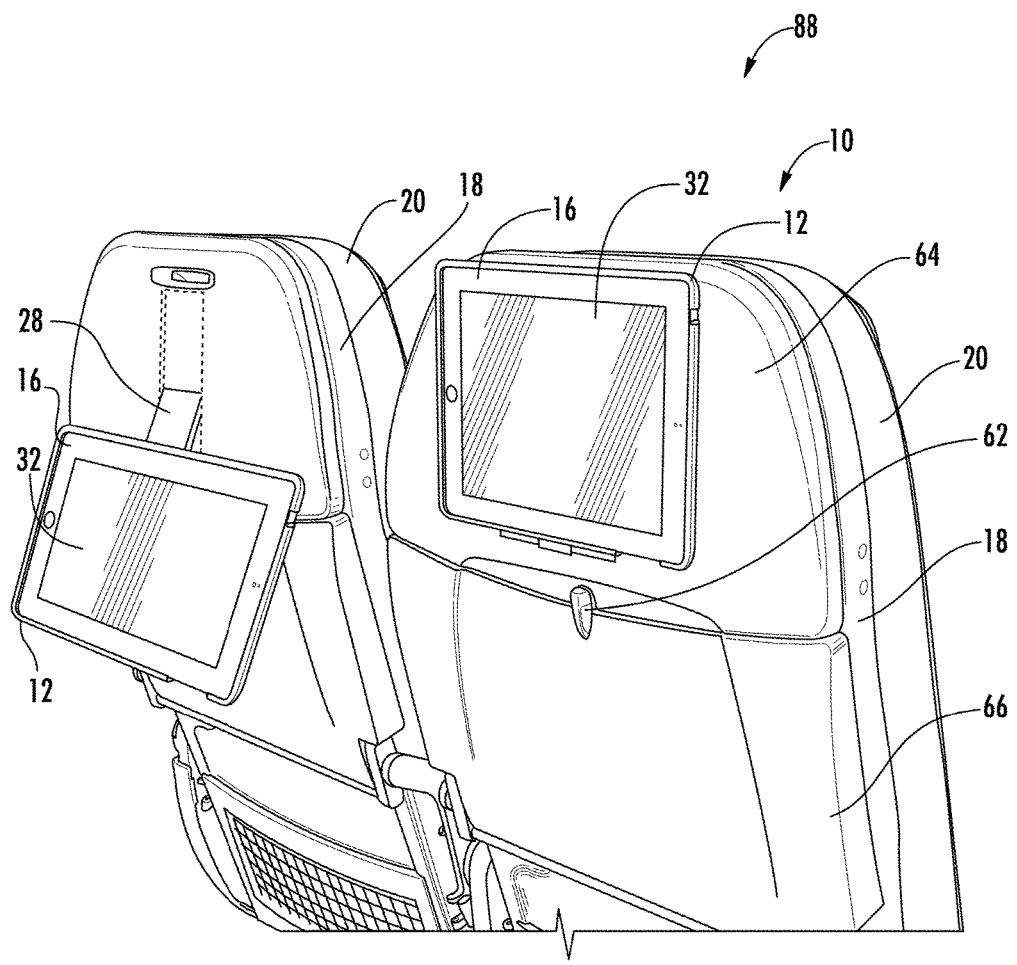
FIG. 1 is a perspective view of a pair of personal electronic device support assemblies with a pair of case assemblies at different stages of stowage, according to certain embodiments of the present invention.

FIGS. 1-7 illustrate embodiments of a PED support assembly 10 in the context of a passenger seat assembly 88 (FIGS. 1 and 8). In these embodiments, the passenger seat assembly 88 may include any suitable arrangement of passenger seats in any carrier. For example, the passenger seat assembly 88 may be included in a passenger aircraft according to a forward-facing configuration (i.e., a passenger seated in a passenger seat of a first passenger seat assembly (not shown) may face a seat back 18 of a passenger seat 20 of the passenger seat assembly 88). In other embodiments, the passenger seat assembly 88 may arranged according to different configurations.

Turning now to the PED support assembly 10, the PED support assembly 10 includes a case assembly 12 and a mounting assembly 14. The case assembly 12 may be formed of materials including but not limited to plastics, rubbers, composite materials, or other suitable materials. In certain embodiments, the case assembly 12 may be formed from materials having impact-resistant properties and capable of minor amounts of deformation. Such deformation and impact-resistance may be desirable for accommodating and protecting a PED 16 which will be held within the case assembly 12.

The case assembly 12 is adapted to receive the PED 16. The PED 16 may be any PED, such as, but not limited to, a tablet computer, a cell phone, a smart phone, a handheld video game system, a personal digital assistant, a palmtop computer, a DVD player, a data or audio-video media player, a monitor, an e-reader device, a multi-media enabled device, or other similar electronic user device. The case assembly 12 is portable and when not mounted in the mounting assembly 14, as illustrated in FIG. 1, a user may transport the PED 16 within the case assembly 12. In other embodiments, a proprietor of the craft in which the mounting assembly 14 resides (e.g., the seat back 18 of the passenger seat 20) may provide the case assembly 12 to passengers in connection with transportation on the craft.

The case assembly 12 may be universal. In other words, the case assembly 12 may be adaptable to different sizes (i.e., length, width, depth, contours, weight, etc.) and types of PEDs. Such adaptability may come from mechanical techniques (e.g., the case assembly 12 may include moveable parts that adjust to different shapes and sizes of PEDs), from non-mechanical techniques (e.g., having a large case assembly and using smaller mounting bodies (not shown) particular to specific PEDs that snugly fit within the large case assembly), properties of the materials used to form the case assembly 12, or the like. An inner surface 22 and an outer surface 24 of the case assembly 12 may be formed from the same materials or from different materials with differing properties. For example, it may be desirable that a material for the outer surface 24 of the case assembly 12 be selected from a group of materials having shock-resistant properties, while it may be desirable that a material for the inner surface 22 (which is in contact with the PED 16) be selected from a different group of materials having deformable properties.

Figure 2A:
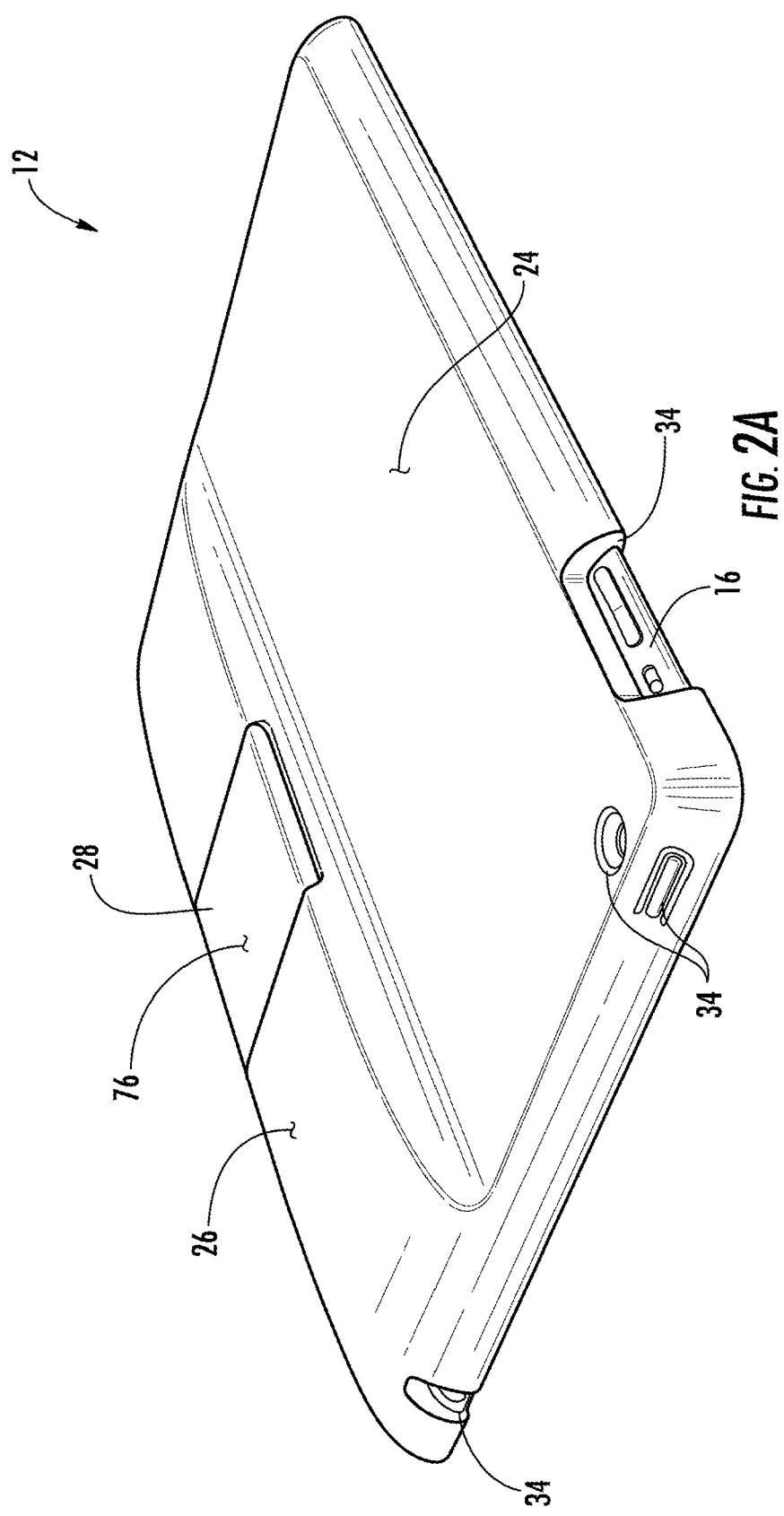
FIG. 2A is a perspective view of a case assembly of a personal electronic device support assembly of FIG. 1 with a tab in a contracted position near an outer surface of the case assembly, according to certain embodiments of the present invention.
Figure 2B:
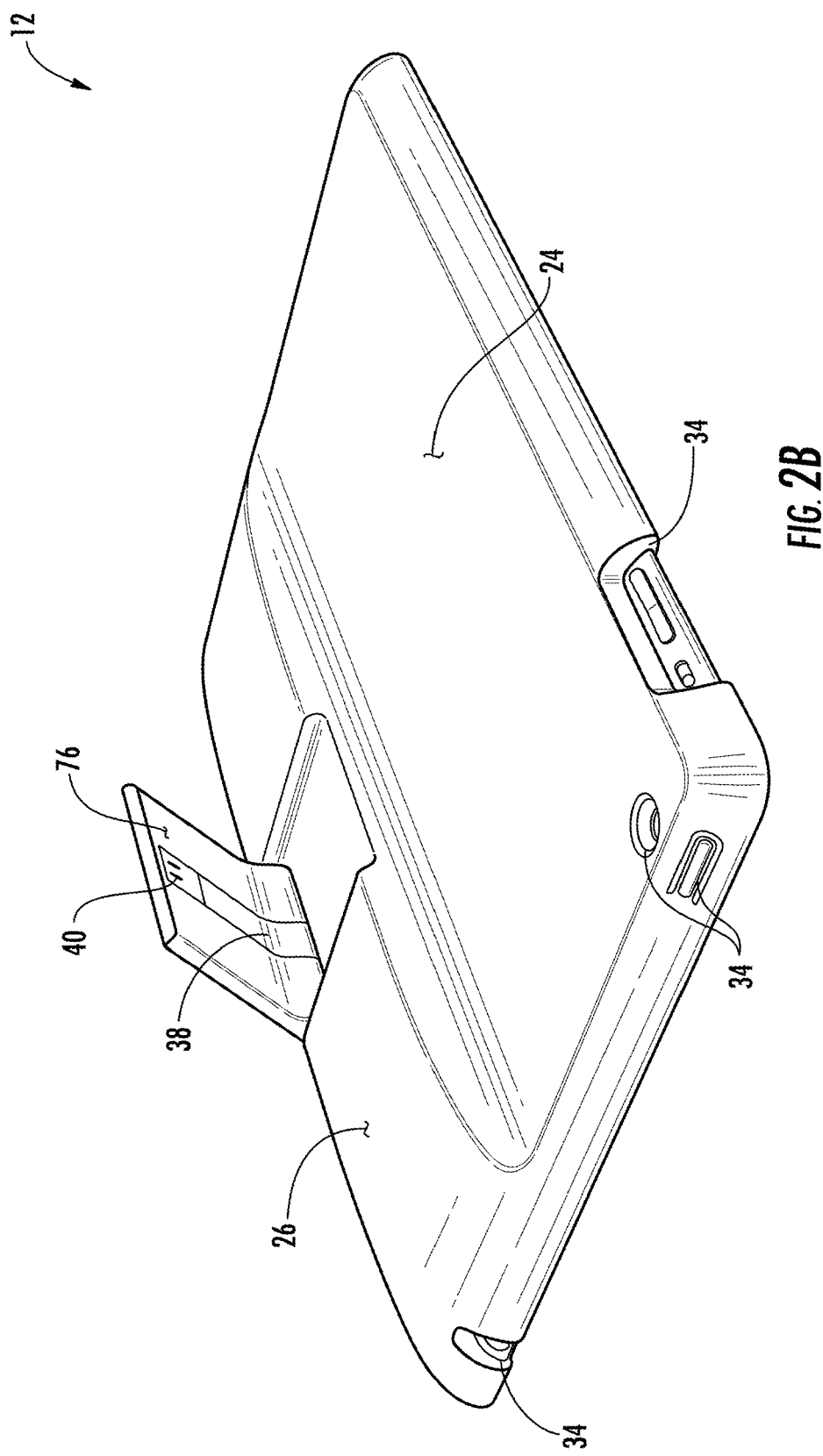
FIG. 2B is a perspective view of the case assembly of the personal electronic device support assembly of FIG. 1 with the tab in an extended position and displaying an interface, according to certain embodiments of the present invention.
Figure 3:
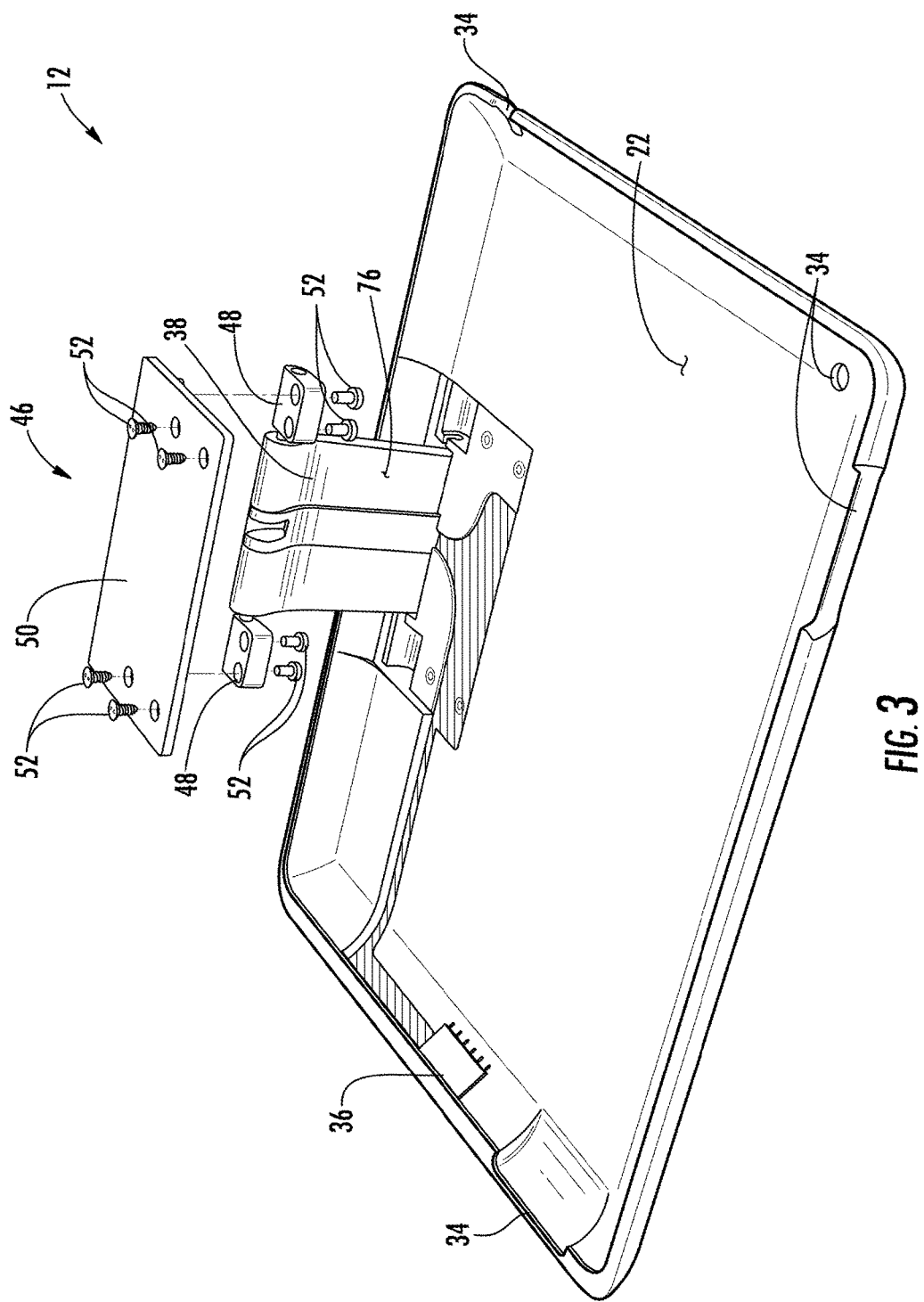
FIG. 3 is a perspective view of the case assembly of the personal electronic device support assembly of FIG. 1 with an exploded view of a hinge assembly and displaying an inner surface, according to certain embodiments of the present invention.
Figure 4:
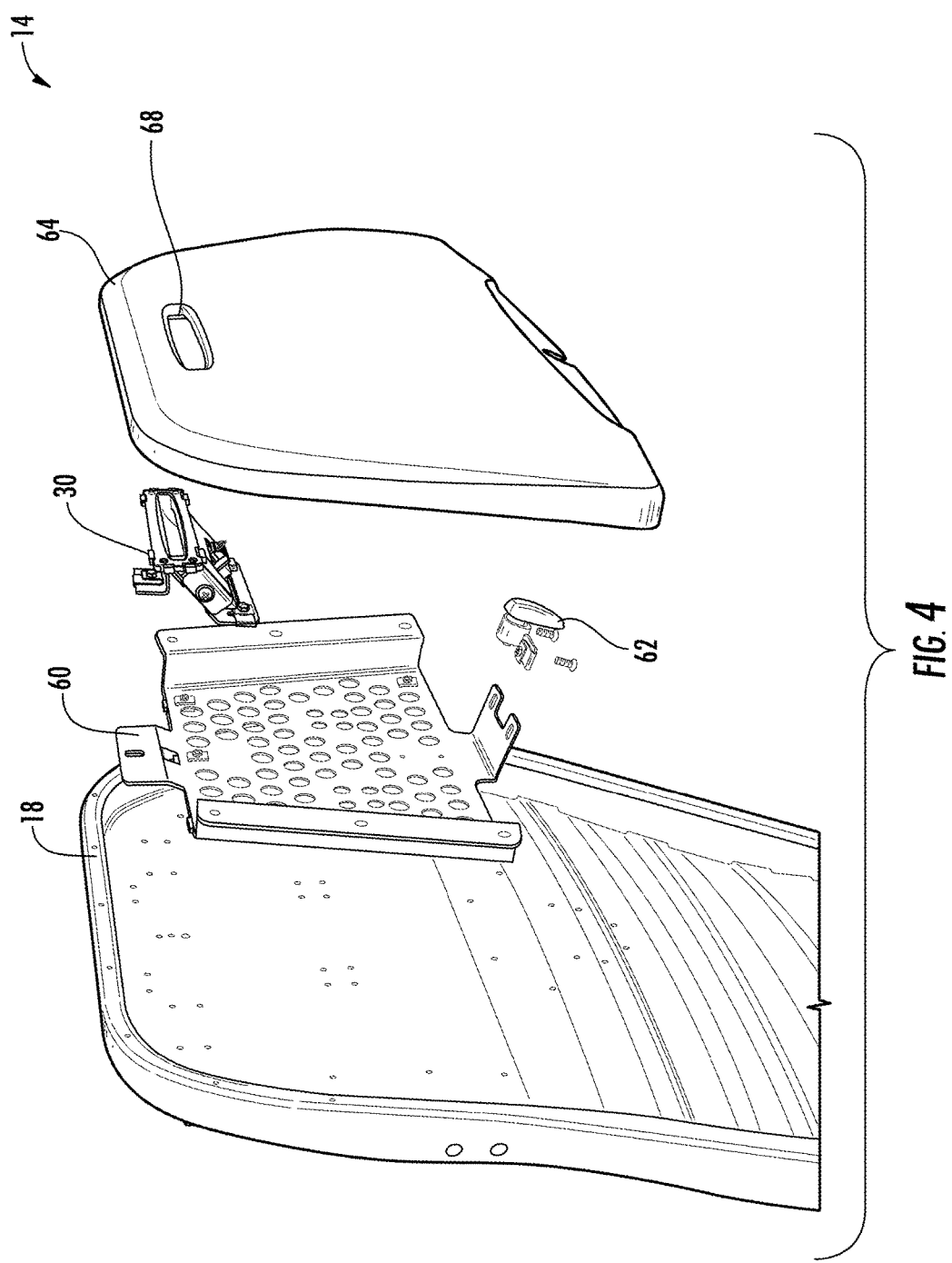
FIG. 4 is a perspective view of a mounting assembly of the personal electronic device support assembly of FIG. 1, according to certain embodiments of the present disclosure.

In certain embodiments, as illustrated in FIGS. 1-3, the case assembly 12 may be sized to accommodate a particular PED, such as the PED 16. The case assembly 12 includes a raised portion 26 of the outer surface 24 to accommodate a tab 28 and its connection assembly (discussed below). The raised portion 26 may also have aesthetic characteristics and may be altered without departing from the spirit and scope of the disclosure. The tab 28, as will be discussed in more detail below, may be pivotally (i.e., rotationally) coupled to the case assembly 12. In a contracted position, the tab 28 contacts the outer surface 24 of the case assembly 12 and is more or less flush with at least the raised portion 26 (see FIG. 2A). In an extended position, an angle may be formed between the tab 28 and the outer surface 24 (see FIG. 2B). This angle may be between about zero degrees (when in the contracted position) and about one-hundred and eighty degrees (when in the extended position). In other embodiments, the angle may be greater than one-hundred and eighty degrees. In this manner, the tab 28 may be rotated to an appropriate angle by the user in order to releasably mount the case assembly 12 in a coupling assembly 30 and afterwards the tab 28 may be rotated to adjust a viewing angle of a screen portion 32 of the PED 16.

The case assembly 12 may also include access port(s) 34. In other embodiments, the case assembly 12 may be devoid of the access ports 34, or have more or less access ports 34 than illustrated in the Figures. In certain embodiments, the access ports 34 may allow the user to interact with the PED 16 while it is mounted in the case assembly 12. Such interaction may include, for example, access to charging ports, access to output/input ports (e.g., audio/video), access to a camera or other optical device, access to volume keys and other hard keys and soft keys, and the like of the PED 16. The number of access ports 34 is unlimited and may depend on type of the PED 16 and type of the case assembly 12.

The user of the PED support assembly 10 may desire to utilize the PED 16 to interact with one or more secondary systems of the craft. Secondary systems may include, for example, one or more networks (e.g., Internet, local area network, mobile network, etc.), one or more OBE or IFE systems, one or more power systems, or the like. In certain embodiments, accessing one or more of these systems may be achieved when the user places the PED 16 into the case assembly 12, connects the PED 16 to the case assembly 12 via a connection port 36, and inserts (i.e., releasably mounts) the tab 28 of the case assembly 12 into the coupling assembly 30 of the mounting assembly 14. The tab 28 includes an interface 38 formed from flexible cable or the like and electric contact point(s) 40. A corresponding connection point (i.e., connector 42) within in the coupling assembly 30 receives the interface 38 when the case assembly 12 is mounted and provides a power and/or a data connection (i.e., access to one or more of the secondary systems) for the PED 16.

In other embodiments, the power and/or data connection may be wireless. For example, a data connection may be achieved via a PED enabled with WiFi, Bluetooth®, or similar wireless technology, and/or networks within and outside the craft for communicating with such an enabled device. Wireless power connection may be achieved, for example, using near field electrodynamic induction (e.g., the Wireless Power Consortium's (WPC) Qi standard), charging pads, or the like. In such an example, a charging pad (i.e., transmitter circuit) may be embedded in either the case assembly 12, a portion of the passenger seat 20 or the seat back 18, as part of the mounting assembly 14, or the like; and the PED 16 may be selected from a group supporting such charging techniques. In other embodiments, a combination of wired (i.e., via the tab 28 or otherwise) and wireless techniques for data and/or power connectivity may be implemented.

In addition to providing power and/or data connectivity, the tab 28 is utilized to support the case assembly 12 when it is mounted in the coupling assembly 30. The tab 28 may be any shape, any size, and any combination of shape and size suitable to fit within a correspondingly-sized female slot structure 44 of the coupling assembly 30. Example combinations of the tab 28 and the female slot structure 44 include rectangular, square, triangular, trapezoidal, spherical, and the like. In certain embodiments, the tab 28 is sized slightly smaller than the female slot structure 44 in order to facilitate a tight fit. Such a tight fit may be desirable in order for the tab 28 to adequately support the case assembly 12 and rigidify the connection. In other embodiments, the fit may be a snap-fit including a release button or the like. In certain embodiments, an adequate fit may limit the movement of the case assembly 12 when mounted, especially under bumpy conditions (e.g., air turbulence).

In certain embodiments, as shown in FIGS. 1-3, the case assembly 12 includes the tab 28 pivotally coupled to a hinge assembly 46. The hinge assembly 46 is attached to the case assembly 12 at the inner surface 22 of the case assembly 12. As illustrated in FIG. 3, the hinge assembly 46 includes a pair of hinges 48, a cap 50, and associated hardware 52. In other embodiments, a single hinge 48 may be suitable. The hinges 48 may be held together with the tab 28 by the cap 50 and the associated hardware 52. The hinges 48 are friction hinges, which may be designed to maintain a constant friction force throughout a range of rotation of the hinges 48. In this manner, the hinges 48 may be utilized to provide adjustability to the case assembly 12, for example, when the case assembly 12 is releasably mounted in the coupling assembly 30 of the mounting assembly 14. In other embodiments, the hinges 48 may be designed to exert a limited friction force and/or differing levels of friction forces during different portions of the range of rotation of the hinges 48. In other words, the hinges 48 may have variable friction properties.

Turning now to adjustability via the hinges 48, as illustrated in FIG. 1, a user of the PED 16 may desire to rotate the screen portion 32 of the PED 16 relative to the seat back 18 of the passenger seat 20. Such rotation may be desirable to better view or interact with the PED 16. To rotate the PED 16, the user may exert a first force on the bottom of the case assembly 12 in a direction away from the seat back 18 such that the bottom of the case assembly 12 rotates away from the seat back 18. An opposite rotation may be achieved by the user exerting a counter force in the opposite direction.

Thus, the hinges 48 may be configured to hold the case assembly 12 in a plurality of different viewing angles relative to the seat back 18. In other embodiments, different types of hinges other than the friction hinges 48 may be used as would be familiar to one having ordinary skill in the art.

When in use as part of the PED support assembly 10, the PED 16 may be placed within the case assembly 12 and held substantially against the inner surface 22. Even when not being used as part of the PED support assembly 10, the PED 16 may be placed within the case assembly 12 to protect the PED 16 from damage.

Figure 6:
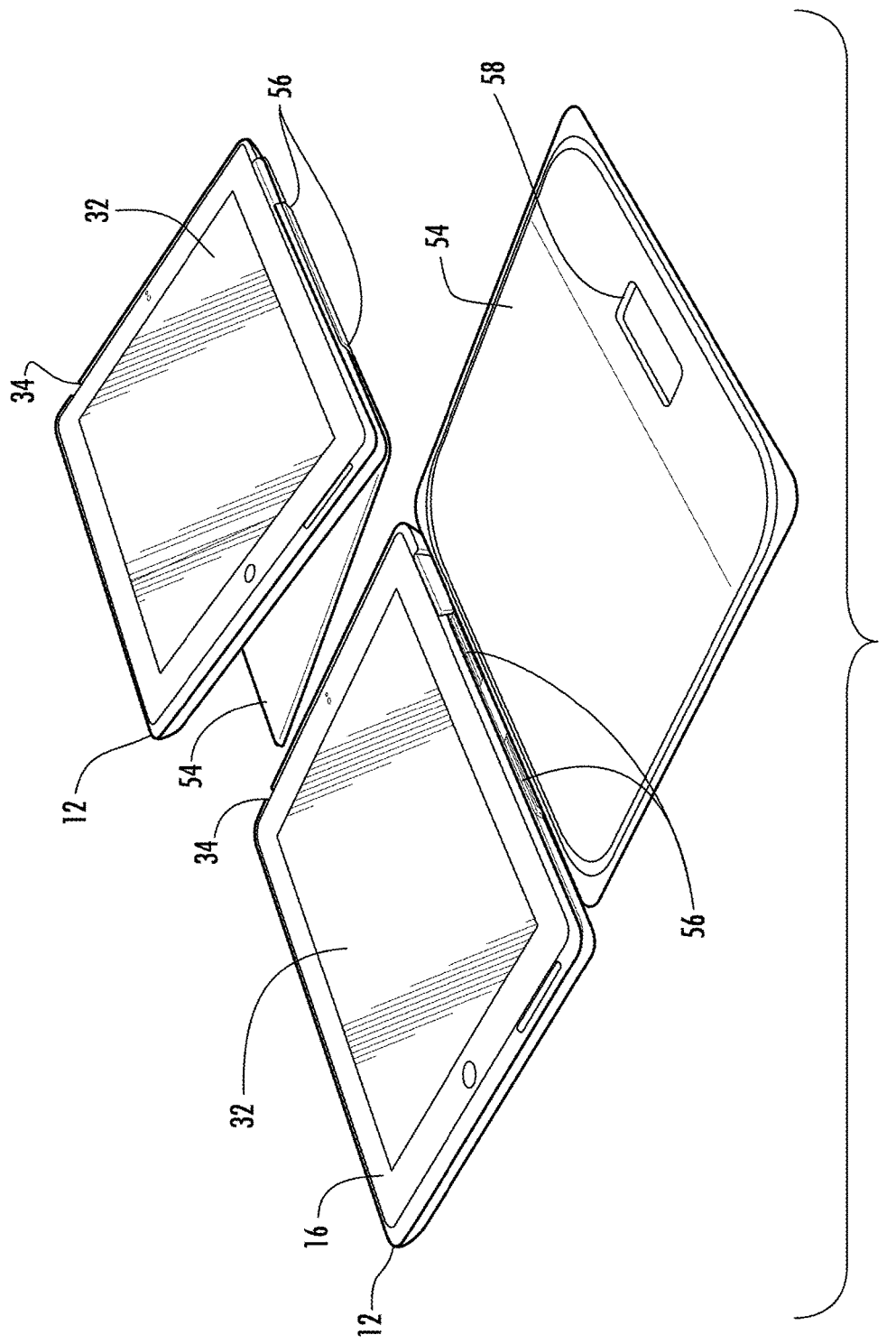
FIG. 6 is a perspective view of a pair of case assemblies of the personal electronic device support assembly of FIG. 1 with covers in different positions, according to certain embodiments of the present invention.
Figure 7:
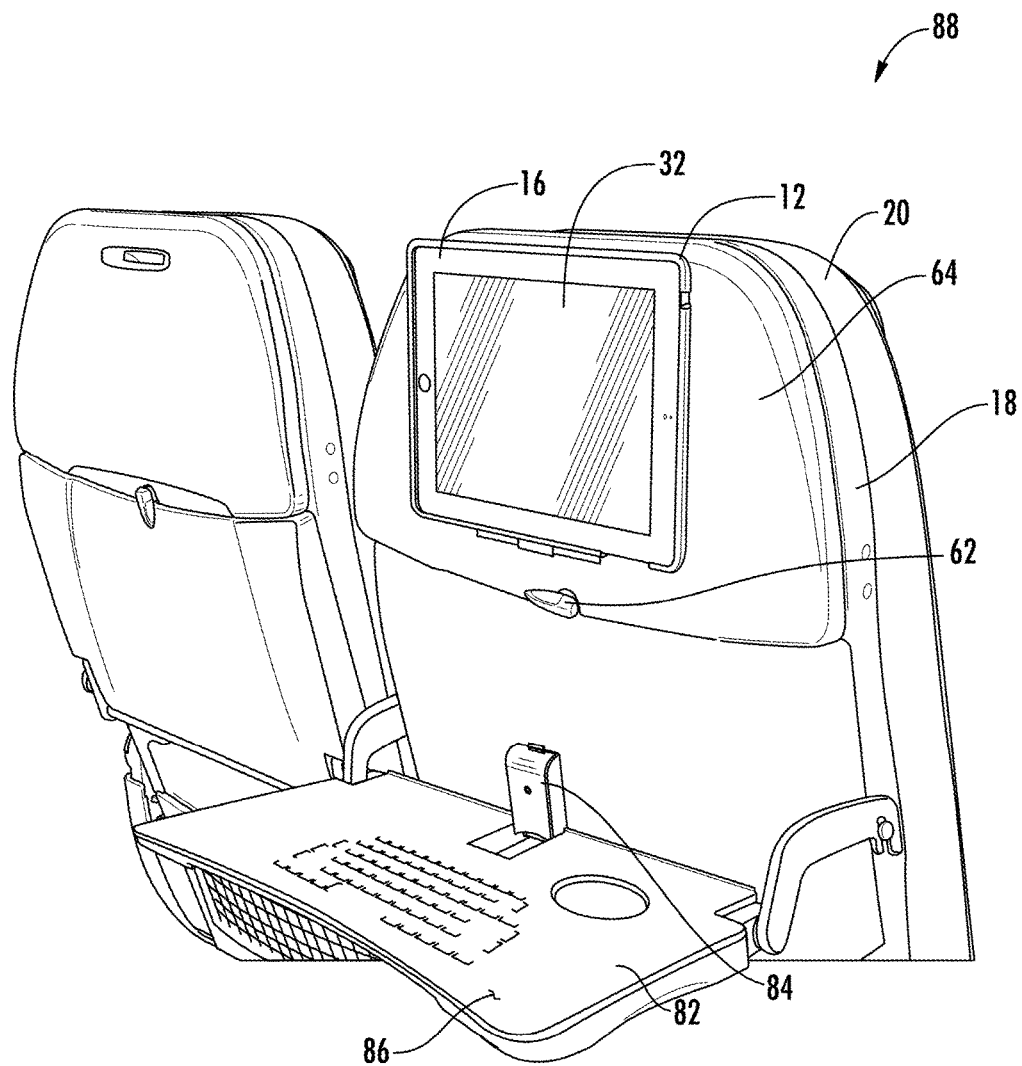
FIG. 7 is a perspective view of the personal electronic device support assembly of FIG. 1 with an integrated keyboard tray in an open position, according to certain embodiments of the present invention.

In some embodiments, as illustrated in FIG. 6, the case assembly 12 includes a cover 54. The cover 54 is releasably attached to the case assembly 12 via a cover hinge 56 and rotatable via the cover hinge 56 from a first position where the cover 54 is in contact with the screen portion 32 of the PED 16 to a second position where the cover 54 is in contact with the outer surface 24 of the case assembly 12. The cover hinge 56 may includes one or more than one hinge and may be mechanical (e.g., bearing with at least two different objects) or non-mechanical (e.g., flexible material, such as fabric or plastic, without mechanical parts) or the like. The cover 54 also includes a tab hole 58. The tab hole 58 is sized slightly larger than the tab 28 such that the tab 28 can extend through the tab hole 58 when the cover 54 is in a third position, between the first and second positions. In other embodiments, the tab 28 may extend through the tab hole 58 when the cover 54 is in the second position. For example, as the user rotates the cover 54 from the first position to the second position, the tab 28 may extend through the tab hole 58. While in the third position, the tab 28 may support the case assembly 12 such that the screen portion 32 of the PED 16 lies in a different plane than the cover 54, the cover 54 and the screen portion 32 may be separated by an angle equal to an angle of rotation of the tab 28 relative to the outer surface 24.

As illustrated in FIG. 6, such angular support may be desirable to provide different, and perhaps more convenient, angles for user interaction when the case assembly 12 is not mounted in the mounting assembly 14. Thus, the tab 28 may function as a stand to support the case assembly 12 when it lies on a surface. Additionally, as discussed previously, different angles may be provided by the tab 28 when the case assembly 12 is used in connection with the mounting assembly 14, such as to alter the viewing angle of the screen portion 32.

According to certain embodiments, the mounting assembly 14 includes the seat back 18, the coupling assembly 30, a seat support bracket 60, a knob 62, and a shroud 64. The seat back 18 may be any passenger seat of any craft. For example, the seat back 18 may be a seat back of an airplane seat. The seat support bracket 60 is disposed between the seat back 18 and the coupling assembly 30. The seat support bracket 60 and the seat back 18 may be formed of materials including but not limited to plastics, composite materials, metals, alloys, carbon fibers, or other suitable materials. The seat support bracket 60 may be utilized to rigidly support the coupling assembly 30 and draw upon the structural rigidity of the seat back 18. The seat support bracket 60 may, in some manner, be secured to the seat back 18 and the coupling assembly 30 and may, in a similar or different manner, be secured to the seat support bracket 60. For example, the seat support bracket 60 may be secured to the seat back 18 using one or more fasteners. Similarly, the coupling assembly 30 may be secured to the seat support bracket 60 using one or more fasteners. In other embodiments, these features may be secured using other techniques, such as, welding, spot welding, friction fit, riveting, etc. The seat support bracket 60 may also include other features, such as connection points for knob 62. The knob 62 may be secured to the seat support bracket 60 and rotatable to secure a tray table 66 when the tray table 66 is in stowed (i.e., upright) position.

The shroud 64 of the mounting assembly 14 may, in some manner, be secured to either the seat support bracket 60, the seat back 18, another feature of the passenger seat 20, or any combination of the above. For example, securement between the shroud 64 and the seat back 18 may include a snap-fit of the shroud 64 in connection with the seat back 18. The shroud 64 may be formed of materials including but not limited to plastics, composite materials, metals, alloys, carbon fibers, or other suitable materials. A suitable material may exhibit certain properties, such as, rigidity, impact resistance, have a final surface capable of cleaning, capable of different colors (e.g., via paint or when formed), etc. The shroud 64 shields the coupling assembly 30 and the seat support bracket 60 from the user. It also protects the user from the coupling assembly 30 and the seat support bracket 60, which may have sharp edges. In this manner, the shroud 64 may contribute to the delethalization of the embodiments described herein. The shroud 64 includes an access slot 68. The access slot 68 may be sized slightly larger than the tab 28. In this manner, the access slot 68 may allow a user to mount the case assembly 12 into the coupling assembly 30 (e.g., insertion of the tab 28 into the female slot structure 44). The access slot 68 may also have a variety of different functional and or aesthetic characteristics depending on the selected embodiment of the present disclosure.

Figure 5:
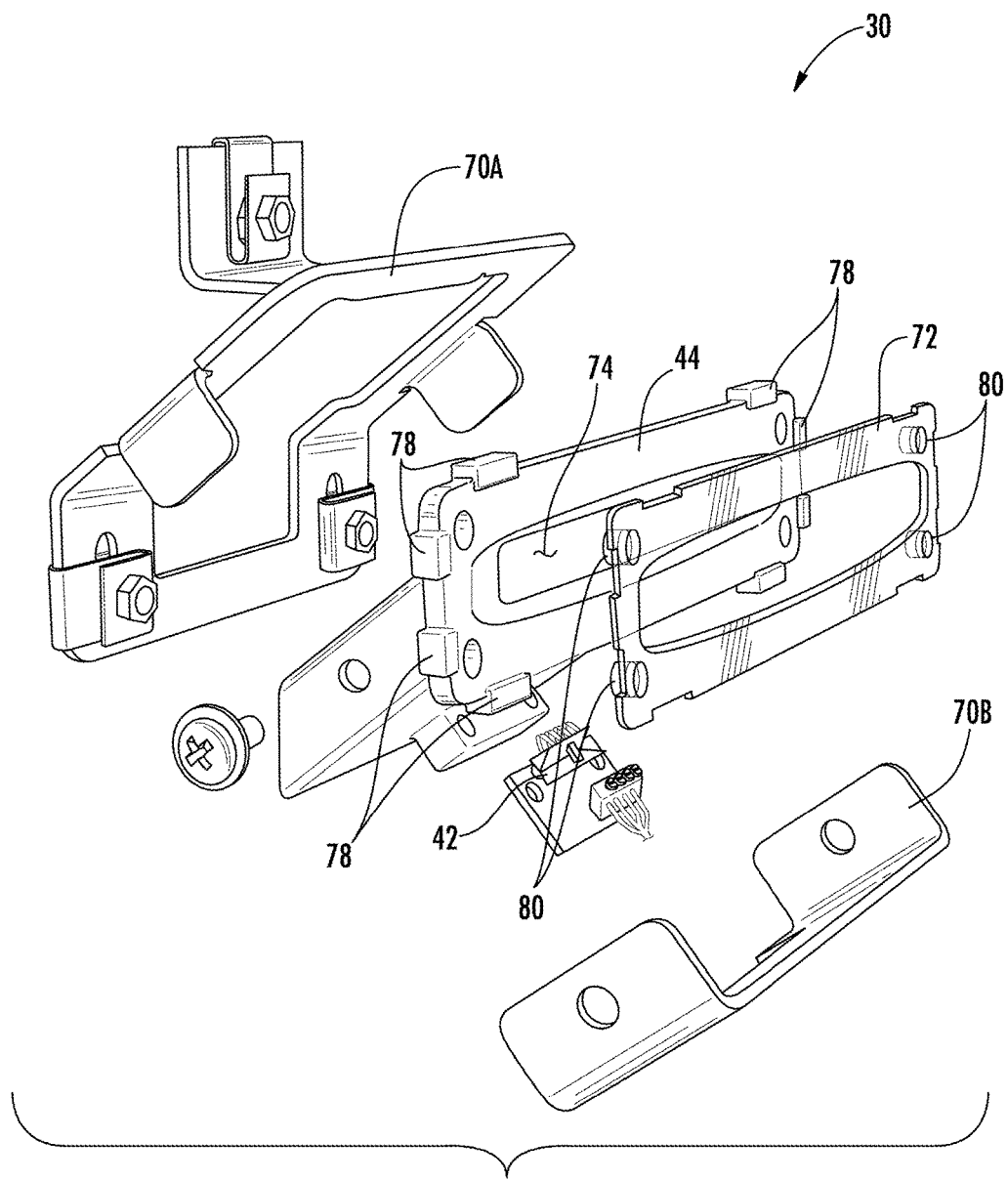
FIG. 5 is a perspective view of the mounting assembly of FIG. 4 with an exploded view of a coupling assembly, according to certain embodiments of the present invention.

According to certain embodiments, as illustrated in FIG. 5, the coupling assembly 30 includes a support bracket 70, the female slot structure 44, a lighting device 72, and the connector 42. In certain embodiments, the support bracket 70 may include an upper support bracket 70A and a lower support bracket 70B. In other embodiments, the support bracket 70 may be one-piece. The support bracket 70 may be used to carry the female slot structure 44 and transfer the load of the case assembly 12 to the seat support bracket 60. To this end, the support bracket 70 may be formed of materials including but not limited to plastics, composite materials, metals, alloys, carbon fibers, or other suitable materials.

The female slot structure 44 may be formed of materials including but not limited to plastics, composite materials, metals, alloys, carbon fibers, or other suitable materials. The female slot structure 44 is configured to receive the tab 28 and support the case assembly 12 when mounted. The female slot structure 44 may be sized slightly larger than the tab 28 of the case assembly 12. Such sizing of the features may enable a snug fit between an interior surface 74 of the female slot structure 44 and an exterior surface 76 of the tab 28. The interior surface 74 may also have properties that increase the friction between the exterior surface 76 of the tab 28 and the interior surface 74 beyond a simple snug fit. Additional discussion of the sizing of the female slot structure 44 is presented above.

The connector 42 may be coupled to the female slot structure 44 or the support bracket 70 in any suitable manner. The connector 42 may be configured to accept the electric contact point 40 of the tab 28 such that power and/or data transmission may take place between the secondary system of the carrier and the PED 16. Examples of connections between the connector 42 and the electric contact point 40 of the tab 28 may include, but are not limited to, male and female plug and socket connectors, ring and spade connectors, Universal Serial Bus (USB) connectors, hybrid connectors, pins and connectors, or any combination of the like. Thus, in some embodiments, the connector 42 may be a new connector capable of transmitting data and power simultaneously to the PED 16. In other embodiments, the connector 42 may be configured as part of wireless data and/or power transmission capabilities.

The lighting device 72 may be a light pipe capable of distributing light through at least a portion of its structure. The lighting device 72 may be formed of materials including but not limited to plastics, metals, and glass. The lighting device 72 may be a hollow structure molded from a suitable material. In other embodiments, the lighting device 72 may have different structural characteristics. The lighting device 72 may function to light the opening of the female slot structure 44 through the shroud 64. In this manner, the lighting device 72 may direct the user to the location of the female slot structure 44 to enable the user to mount the case assembly 12. Such lighting may be desirable in low-light conditions and may also be desirable in even heavy-light conditions. According to embodiments of the present disclosure, the lighting device 72 may be selected to provide a large or small range of lighting intensities. For example, the lighting device 72 may utilize forms of light production and reflection including, for example, light tubes/pipes, light-emitting diodes (LEDs), incandescent light bulbs, fluorescent lighting, photo-luminescent strips, etc.

The lighting device 72 may be disposed near the opening of the female slot structure 44. Similar to the female slot structure 44, the lighting device 72 may be sized slightly larger than the tab 28. However, in other embodiments, the lighting device 72 may be much larger than the tab 28 or be positioned and sized independent of the size and shape of the tab 28 and/or the opening of the female slot structure 44. In this embodiment, the lighting device 72 may be attached to the face of the female slot structure 44. In order for proper alignment between the lighting device 72 and the female slot structure 44, a plurality of alignment tabs 78 and a plurality of index points 80 may be provided. In other embodiments, more or less alignment tabs 78 and more or less index points 80 may be included.

As part of a system implementing the embodiments described with respect to the PED support assembly 10 in the context of the passenger seat assembly 88, an integrated keyboard tray 82 may be provided. The integrated keyboard tray 82, as more fully described in related Application Ser. Number PCT/US2013/69583 identified above, may be disposed at the seat back 18 of the passenger seat 20 below the shroud 64 in the place of the tray table 66. The integrated keyboard tray 82 may have all of the functionality of the tray table 66 (e.g., hold food, drinks, books, have hinges that rotate from a stowed to a downwards position, etc.), but may also include additional functionality. For example, according to certain embodiments, the integrated keyboard tray 82 may include a module 84 configured to detect user interaction with a top surface 86 of the integrated keyboard tray 82. The module 84 may also allow the detected user interaction to be transmitted to the PED 16 within the case assembly 12 while mounted in the coupling assembly 30. Such transmission may be wireless or via a wired connection. In other words, the user may be able to interact with the top surface 86 of the integrated keyboard tray 82, and that interaction may be reflected on the PED 16 (e.g., text input/editing, drawing, controlling media players, web browsing, scrolling, etc.). In this manner, the user may conveniently interact with the PED 16 when mounted, whether it be his or her own PED or one provided by the carrier.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A personal electronic device support assembly comprising:
    a coupling assembly comprising a female slot structure and a support bracket, wherein the support bracket affixes the female slot structure to another structure;
    a case assembly comprising:
        a case configured to releasably couple to a personal electronic device; and
        a male structure pivotally coupled to the case; and
        a shroud including an access slot sized larger than the male structure, wherein a portion of the male structure extends through the shroud when the female slot structure receives the male structure; and
    wherein the female slot structure and the support bracket are disposed between the seat support bracket and the shroud;
    wherein, when the case assembly is releasably coupled to the other structure, the case assembly is releasably coupled to the personal electronic device, and the male structure is rotated into an extended position and inserted into the female slot structure of the coupling assembly; and
    wherein, when the case assembly is not releasably coupled to the other structure, the case assembly is configured to remain releasably connected to the personal electronic device as a protective cover, and the male structure is configured to function as a stand to support the case assembly at an angled position when rotated into the extended position or fit within a recess in the case when rotated into a stowed position.

2. The personal electronic device support assembly of claim 1, wherein the seat comprises a seat back of a passenger seat.

3. The personal electronic device support assembly of claim 1, further comprising a connector configured to provide at least one of power transmission or data transmission between the personal electronic device and a secondary system.

4. The personal electronic device support assembly of claim 3, wherein the secondary system comprises at least one of a power supply, a network, an on-board entertainment system, and an in-flight entertainment system.

5. The personal electronic device support assembly of claim 1, further comprising a lighting device disposed at an outer surface of the female slot structure, wherein the lighting device is configured to identify the female slot structure in at least low-light conditions.

6. A passenger seat assembly comprising:
    a passenger seat;
    a coupling assembly comprising a female slot structure and a support bracket, wherein the support bracket affixes the female slot structure to the passenger seat; and a case assembly comprising:
  a case configured to releasably couple to a personal electronic device; and
  a male structure pivotally coupled to the case;
an integrated keyboard tray disposed below the case assembly, wherein the integrated keyboard tray is configured to allow a user to interact with at least the personal electronic device;
wherein, when the case assembly is releasably coupled to the passenger seat, the case assembly is releasably coupled to the personal electronic device, and the male structure is rotated into an extended position and inserted into the female slot structure of the coupling assembly; and
wherein, when the case assembly is not releasably coupled to the passenger seat, the case assembly is configured to remain releasably connected to the personal electronic device as a protective cover, and the male structure is configured to function as a stand to support the case assembly at an angled position when rotated into the extended position or fit within a recess in the case when rotated into a stowed position.

7. The passenger seat assembly of claim 6, further comprising an interface coupled to the male structure, wherein the interface is configured to connect the personal electronic device to a secondary system, the secondary system including at least one of data transmission capability and power transmission capability.

8. The passenger seat assembly of claim 7, wherein the interface is configured to connect the personal electronic device wirelessly to the secondary system.

9. The personal electronic device support assembly of claim 6, further comprising a lighting device disposed at an outer surface of the female slot structure, wherein the lighting device is configured to identify the female slot structure in at least low-light conditions.

10. A personal electronic device support assembly comprising:
  a coupling assembly comprising a female slot structure and a support bracket, wherein the support bracket affixes the female slot structure to another structure; and
  a case assembly comprising:
    a case configured to releasably couple to a personal electronic device; and
    a male structure pivotally coupled to the case;
  a lighting device disposed at an outer surface of the female slot structure, wherein the lighting device is configured to identify the female slot structure in at least low-light conditions;
  wherein, when the case assembly is releasably coupled to the other structure, the case assembly is releasably coupled to the personal electronic device, and the male structure is rotated into an extended position and inserted into the female slot structure of the coupling assembly;
  wherein, when the case assembly is not releasably coupled to the other structure, the case assembly is configured to remain releasably connected to the personal electronic device as a protective cover, and the male structure is configured to function as a stand to support the case assembly at an angled position when rotated into the extended position or fit within a recess in the case when rotated into a stowed position.

11. The personal electronic device support assembly of claim 10, further comprising:
  a shroud including an access slot sized larger than the male structure, wherein a portion of the male structure extends through the shroud when the female slot structure receives the male structure.

12. The personal electronic device support assembly of claim 10, further comprising a connector, wherein the connector is configured to provide at least one of power transmission or data transmission between the personal electronic device and a secondary system.

13. The personal electronic device support assembly of claim 12, wherein the secondary system comprises at least one of a power supply, a network, an on-board entertainment system, and an in-flight entertainment system.

* * * * *